US011961655B2

(12) United States Patent
Takai

(10) Patent No.: US 11,961,655 B2
(45) Date of Patent: Apr. 16, 2024

(54) MULTILAYER COIL COMPONENT

(71) Applicant: Murata Manufacturing Co., Ltd., Kyoto-fu (JP)

(72) Inventor: Shun Takai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 661 days.

(21) Appl. No.: 17/133,436

(22) Filed: Dec. 23, 2020

(65) Prior Publication Data

US 2021/0202162 A1 Jul. 1, 2021

(30) Foreign Application Priority Data

Dec. 27, 2019 (JP) ................................ 2019-238905

(51) Int. Cl.

| | |
|---|---|
| ***H01F 27/32*** | (2006.01) |
| ***H01F 17/00*** | (2006.01) |
| ***H01F 27/28*** | (2006.01) |
| ***H01F 27/29*** | (2006.01) |

(52) U.S. Cl.

CPC ....... *H01F 27/324* (2013.01); *H01F 17/0013* (2013.01); *H01F 27/2804* (2013.01); *H01F 27/292* (2013.01); *H01F 2017/002* (2013.01)

(58) Field of Classification Search

CPC ............... H01F 27/324; H01F 17/0013; H01F 27/2804; H01F 27/292; H01F 2017/002

USPC ........................................................ 336/200

See application file for complete search history.

(56) References Cited

U.S. PATENT DOCUMENTS

| | | | | |
|---|---|---|---|---|
| 8,410,887 | B2 * | 4/2013 | Nanjyo | H01F 17/0033 336/200 |
| 2014/0085037 | A1 * | 3/2014 | Shin | H01F 41/046 156/89.12 |
| 2018/0019052 | A1 * | 1/2018 | Hashimoto | H01F 41/046 |
| 2018/0308617 | A1 | 10/2018 | Ha et al. | |
| 2019/0214188 | A1 * | 7/2019 | Imada | H01F 27/24 |
| 2020/0251273 | A1 * | 8/2020 | Takai | H01F 27/292 |

FOREIGN PATENT DOCUMENTS

| | | | | |
|---|---|---|---|---|
| CN | 102791076 | A | * | 11/2012 |
| JP | H04-65807 | A | | 3/1992 |
| JP | 2005072267 | A | * | 3/2005 |
| JP | 2012129367 | A | * | 7/2012 |

(Continued)

*Primary Examiner* — Bickey Dhakal
*Assistant Examiner* — Joselito S. Baisa
(74) *Attorney, Agent, or Firm* — Studebaker & Brackett PC

(57) ABSTRACT

A multilayer coil component includes an insulator portion, a coil in the insulator portion and including coil conductor layers electrically connected together, and an outer electrode on a surface of the insulator portion and electrically connected to the coil. The multilayer coil component has a void at a boundary between one main surface of each coil conductor layer and the insulator portion. At least one of the coil conductor layers includes extended and winding portions, and is connected to the electrode via the extended portion. Viewing the multilayer coil component in plan view in a stacking direction, an end of the void at the extended portion facing the electrode to which the extended portion is connected is closer to the electrode than is an end, facing the electrode, of the void at the coil conductor layer to which the extended portion is adjacent in the stacking direction.

20 Claims, 5 Drawing Sheets

(56) References Cited

FOREIGN PATENT DOCUMENTS

| | | | | | |
|---|---|---|---|---|---|
| JP | 2018011014 A | * | 1/2018 | ......... | H01F 17/0013 |
| JP | 2019047015 A | | 3/2019 | | |
| JP | 2019-102691 A | | 6/2019 | | |
| JP | 2021125597 A | * | 8/2021 | ......... | H01F 17/0013 |
| WO | WO-2012008171 A1 | * | 1/2012 | ......... | H01F 17/0033 |

* cited by examiner

MULTILAYER COIL COMPONENT

CROSS-REFERENCE TO RELATED APPLICATION

This application claims benefit of priority to Japanese Patent Application No. 2019-238905, filed Dec. 27, 2019, the entire contents of which is incorporated herein by reference.

BACKGROUND

Technical Field

The present disclosure relates to multilayer coil components and methods for manufacturing multilayer coil components.

Background Art

An example of a multilayer coil component known in the related art includes a body and a coil disposed in the body, as described, for example, in Japanese Unexamined Patent Application Publication No. 2019-47015. The multilayer coil component disclosed in Japanese Unexamined Patent Application Publication No. 2019-47015 is manufactured by a method of manufacture that includes forming coil conductor layers with a thickness of about 30 μm on magnetic layers for formation of the body and then forming different magnetic layers for step coverage over the magnetic layers to form coil conductor printed sheets, bonding the coil conductor printed sheets together by pressure to obtain an unfired multilayer body, and firing the multilayer body.

The recent trend toward a higher current in electronic devices has led to a need for a multilayer coil component with a lower direct current resistance. To reduce the direct current resistance, it is generally necessary to increase the thickness of a conductor forming a coil so that the conductor has a larger cross-sectional area. In this case, an extended portion for connection between the coil conductor layer and an outer electrode also becomes thicker, which results in a higher stress and thus increases the likelihood of cracking.

SUMMARY

Accordingly, the present disclosure provides a multilayer coil component that includes thick coil conductor layers and that is less susceptible to cracking and a method for manufacturing such a multilayer coil component.

According to preferred embodiments of the present disclosure, there is provided a multilayer coil component including an insulator portion, a coil embedded in the insulator portion and including a plurality of coil conductor layers electrically connected together, and an outer electrode disposed on a surface of the insulator portion and electrically connected to the coil. The multilayer coil component has a void at a boundary between one main surface of each coil conductor layer and the insulator portion. At least one of the coil conductor layers includes an extended portion and a winding portion and is connected to the outer electrode via the extended portion. As the multilayer coil component is viewed in plan view in a stacking direction, an end of the void at the extended portion facing the outer electrode to which the extended portion is connected is located closer to the outer electrode than is an end, facing the outer electrode, of the void at the coil conductor layer to which the extended portion is adjacent in the stacking direction.

In the multilayer coil component, the distance between the end of the void at the extended portion and the end of the void at the coil conductor layer to which the extended portion is adjacent in the stacking direction may be 50 μm to 150 μm.

In the multilayer coil component, the winding portion of the coil conductor layer may have a thickness of 25 μm to 50 μm.

In the multilayer coil component, the extended portion may include a thicker portion and a thinner portion, and the thicker portion may be located closer to the outer electrode to which the extended portion is connected.

In the multilayer coil component, the ratio of the thickness of the thicker portion to the thickness of the thinner portion may be 1.05 to 2.00.

In the multilayer coil component, the thinner portion may have a thickness of 15 μm to 45 μm.

According to preferred embodiments of the present disclosure, a multilayer coil component that includes thick coil conductor layers and that is less susceptible to cracking can be provided. Thus, according to preferred embodiments of the present disclosure, a multilayer coil component that can be used in high-current applications and that has high reliability can be provided.

Other features, elements, characteristics and advantages of the present disclosure will become more apparent from the following detailed description of preferred embodiments of the present disclosure with reference to the attached drawings.

DETAILED DESCRIPTION

A multilayer coil component according to an embodiment of the present disclosure will hereinafter be described in detail with reference to the drawings. However, the shapes, arrangements, and other details of the multilayer coil component according to the present embodiment and the individual constituent elements thereof are not limited to the illustrated example.

Figure 1:
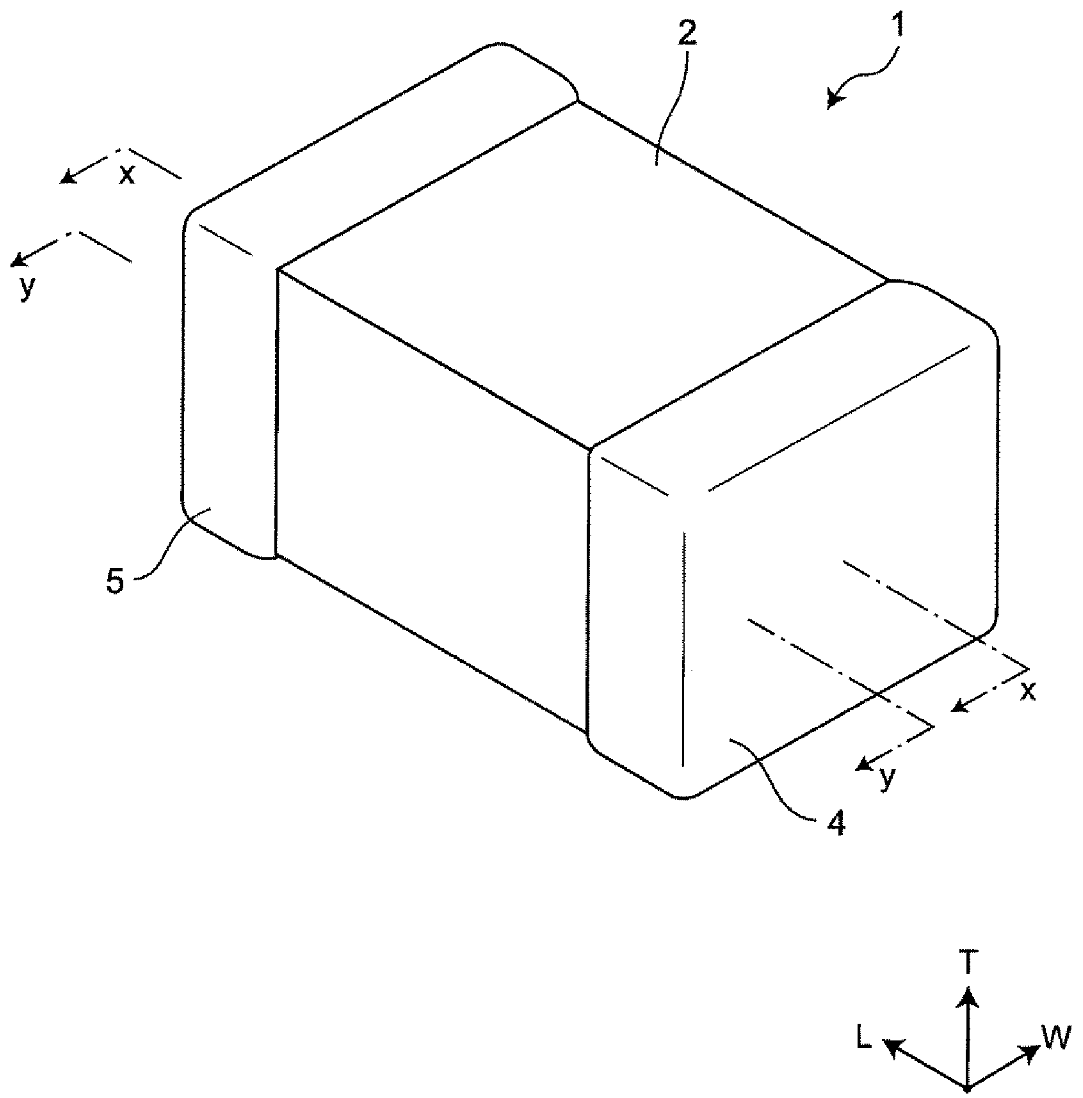
FIG. 1 is a schematic perspective view of a multilayer coil component 1 according to an embodiment of the present disclosure.
Figure 2:
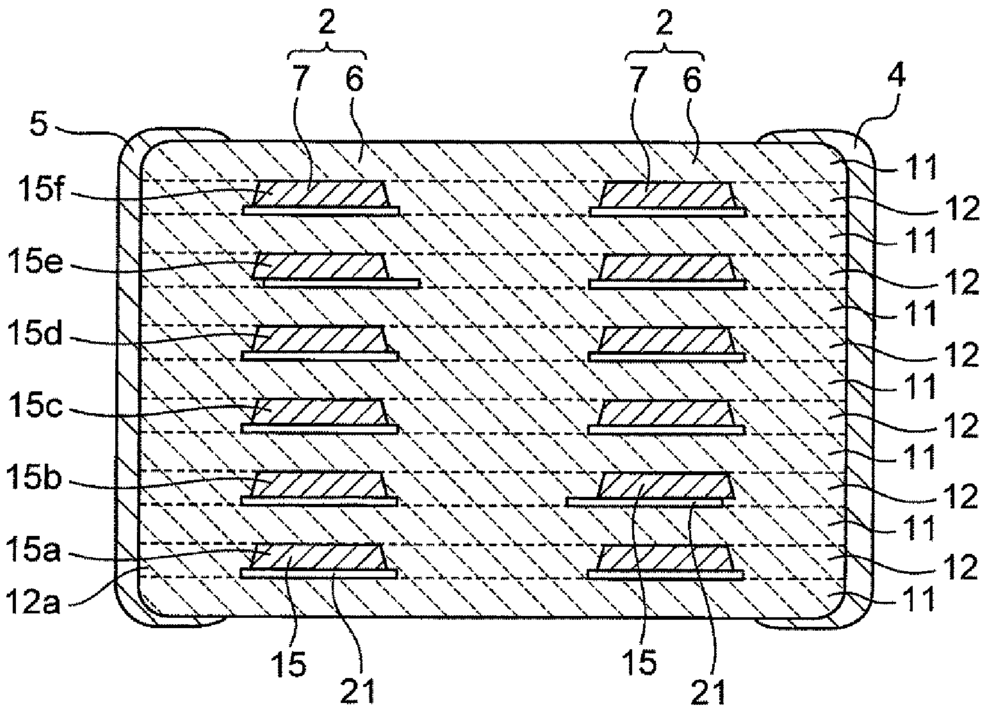
FIG. 2 is a sectional view illustrating a cross-section of the multilayer coil component 1 taken along line x-x in FIG. 1.
Figure 3:
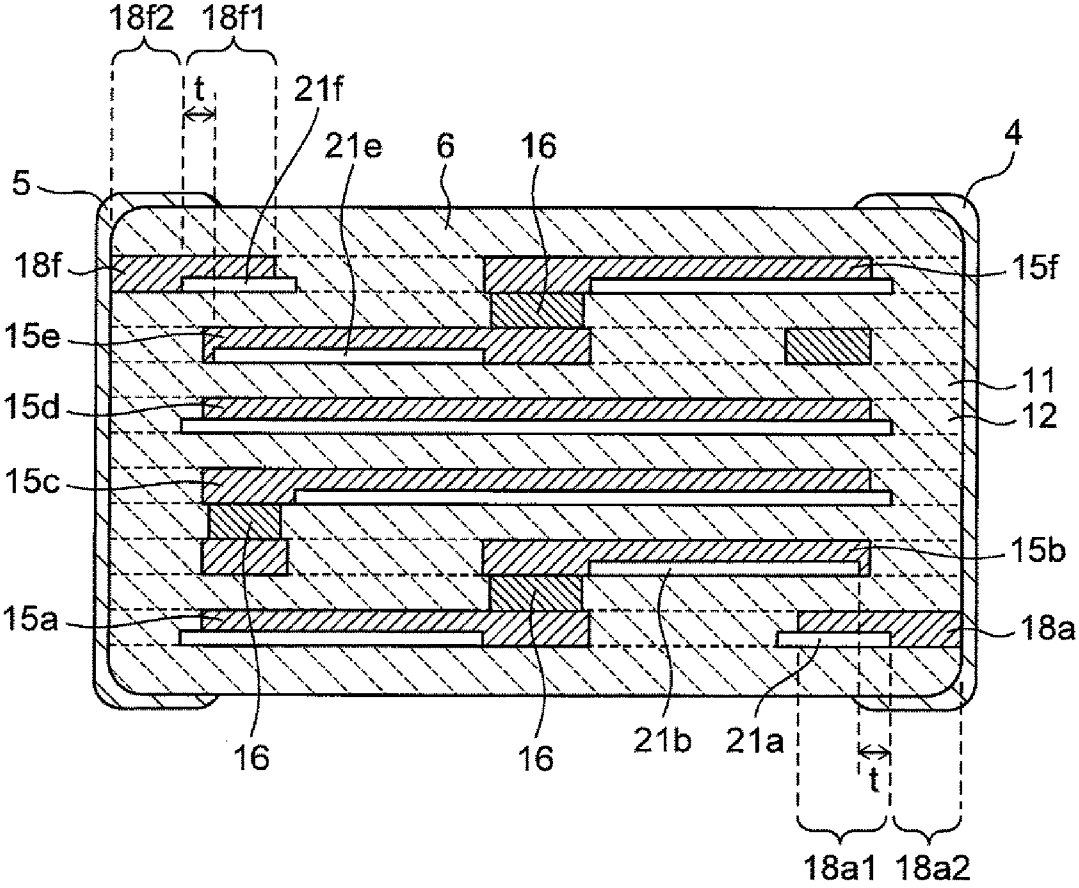
FIG. 3 is a sectional view illustrating a cross-section of the multilayer coil component 1 taken along line y-y in FIG. 1.

FIG. 1 illustrates a perspective view of a multilayer coil component 1 according to the present embodiment. FIG. 2 illustrates a sectional view taken along line x-x in FIG. 1. FIG. 3 illustrates a sectional view taken along line y-y in FIG. 1. However, the shapes, arrangements, and other details of the multilayer coil component according to the embodiment described below and the individual constituent elements thereof are not limited to the illustrated example.

As illustrated in FIGS. 1 to 3, the multilayer coil component 1 according to the present embodiment has a substantially rectangular parallelepiped shape. The surfaces of the multilayer coil component 1 perpendicular to the L axis in FIG. 1 are referred to as "end surface". The surfaces of the multilayer coil component 1 perpendicular to the W axis in FIG. 1 are referred to as "side surface". The surfaces of the multilayer coil component 1 perpendicular to the T axis in FIG. 1 are referred to as "upper surface" and "lower surface". The multilayer coil component 1 generally includes a body 2 and outer electrodes 4 and 5 disposed on both end surfaces of the body 2. The body 2 includes an insulator portion 6 and a coil 7 embedded in the insulator portion 6. The insulator portion 6 includes first insulator layers 11 and second insulator layers 12. The coil 7 is composed of coil conductor layers 15 connected together in a coil pattern via connection conductors 16 extending through the first insulator layers 11. Of the coil conductor layers 15, coil conductor layers 15*a* and 15*f* located in the lowermost and uppermost layers include extended portions 18*a* and 18*f*, respectively. The coil 7 is connected to the outer electrodes 4 and 5 via the extended portions 18*a* and 18*f*. The multilayer coil component 1 has voids 21 between the insulator portion 6 and the main surfaces (lower main surfaces in FIGS. 2 and 3) of the coil conductor layers 15, that is, between the first insulator layers 11 and the coil conductor layers 15. As the multilayer coil component 1 is viewed in plan view in the stacking direction, an end of a void 21*a* at the extended portion 18*a* facing the outer electrode 4 is located closer to the outer electrode 4 than is an end, facing the outer electrode 4, of a void 21*b* at the coil conductor layer 15*b* to which the extended portion 18*a* is adjacent. Similarly, an end of a void 21*f* at the extended portion 18*f* facing the outer electrode 5 is located closer to the outer electrode 5 than is an end, facing the outer electrode 5, of a void 21*e* at the coil conductor layer 15*e* to which the extended portion 18*f* is adjacent.

The above multilayer coil component 1 according to the present embodiment will hereinafter be described. The embodiment described herein is an embodiment in which the insulator portion 6 is formed from a ferrite material.

The body 2 of the multilayer coil component 1 according to the present embodiment is composed of the insulator portion 6 and the coil 7.

The insulator portion 6 may include the first insulator layers 11 and the second insulator layers 12.

The first insulator layers 11 are disposed between the coil conductor layers 15 adjacent to each other in the stacking direction and between the coil conductor layers 15 and the upper and lower surfaces of the body 2.

The second insulator layers 12 are disposed around the coil conductor layers 15 such that the upper surfaces (upper main surfaces in FIGS. 2 and 3) of the coil conductor layers 15 are exposed. In other words, the second insulator layers 12 form layers at the same heights as the coil conductor layers 15 in the stacking direction. For example, the second insulator layer 12*a* in FIG. 2 is located at the same height as the coil conductor layer 15*a* in the stacking direction.

That is, in the multilayer coil component according to the present embodiment, the insulator portion is a multilayer body including first and second insulator layers, the coil conductor layers are disposed on the first insulator layers, and the second insulator layers are disposed on the first insulator layers so as to be adjacent to the coil conductor layers.

The thickness of the first insulator layers 11 between the coil conductor layers 15, particularly the thickness of the first insulator layers 11 between the extended portions 18 and the coil conductor layers 15 adjacent thereto in the stacking direction, may preferably be about 5 μm to about 100 μm, more preferably about 10 μm to about 50 μm, even more preferably about 10 μm to about 30 μm. If the thickness is about 5 μm or more, insulation can be more reliably ensured between the coil conductor layers 15. If the thickness is about 100 μm or less, better electrical characteristics can be achieved.

In one embodiment, portions of the second insulator layers 12 may be disposed so as to extend over the outer edge portions of the coil conductor layers 15. In other words, the second insulator layers 12 may be disposed so as to cover the outer edge portions of the coil conductor layers 15. That is, as the coil conductor layers 15 and the second insulator layers 12 adjacent to each other are viewed in plan view from the upper side, the second insulator layers 12 may extend inwardly of the outer edges of the coil conductor layers 15.

The first insulator layers 11 and the second insulator layers 12 may be integrated with each other in the body 2. In this case, the first insulator layers 11 can be assumed to be present between the coil conductor layers 15, whereas the second insulator layers 12 can be assumed to be present at the same heights as the coil conductor layers 15.

The insulator portion 6 is preferably formed of a magnetic material, more preferably a sintered ferrite. The sintered ferrite contains at least Fe, Ni, and Zn as the main constituents. The sintered ferrite may further contain Cu.

The first insulator layers 11 and the second insulator layers 12 may have the same composition or different compositions. In a preferred embodiment, the first insulator layers 11 and the second insulator layers 12 have the same composition.

In one embodiment, the sintered ferrite contains at least Fe, Ni, Zn, and Cu as the main constituents.

The Fe content of the sintered ferrite on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the sintered ferrite on a ZnO basis may preferably be about 5.0 mol % to about 35.0 mol %, more preferably about 10.0 mol % to about 30.0 mol % (based on the total amount of the main constituents; the same applies hereinafter).

The Cu content of the sintered ferrite on a CuO basis is preferably about 4.0 mol % to about 12.0 mol %, more preferably about 7.0 mol % to about 10.0 mol % (based on the total amount of the main constituents; the same applies hereinafter).

The Ni content of the sintered ferrite is not particularly limited and may be the balance excluding the other main constituents described above, namely, Fe, Zn, and Cu.

In one embodiment, the sintered ferrite contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the sintered ferrite may further contain additive constituents. Examples of additive constituents for the sintered ferrite include, but not limited to, Mn, Co, Sn, Bi, and Si. The Mn, Co, Sn, Bi, and Si contents (amounts added) on $Mn_3O_4$, $Co_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The sintered ferrite may further contain incidental impurities introduced during manufacture.

As described above, the coil 7 is composed of the coil conductor layers 15 electrically connected to each other in a coil pattern. The coil conductor layers 15 adjacent to each other in the stacking direction are connected together via the connection conductors 16 extending through the insulator portion 6 (specifically, the first insulator layers 11). In the present embodiment, the coil conductor layers 15 are referred to as, in order from the lower side, "coil conductor layers 15*a* to 15*f*".

Figure 4:
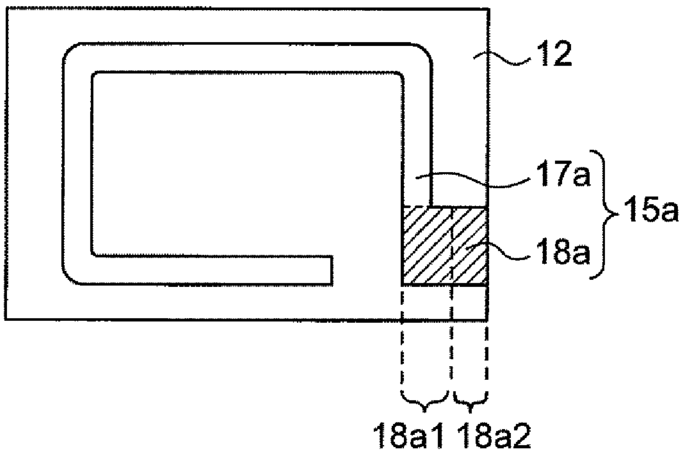
FIG. 4 is a plan view of a layer of the multilayer coil component 1 in which a coil conductor layer 15*a* is present as viewed in the stacking direction.

The coil conductor layers 15*a* and 15*f* each include a winding portion and an extended portion. For example, as illustrated in FIG. 4, the coil conductor layer 15*a* includes a winding portion 17*a* and an extended portion 18*a*. Here, the extended portions are portions located at ends of the coil conductor layers and connecting the coil conductors to the outer electrodes.

Examples of materials that form the coil conductor layers 15 include, but not limited to, Au, Ag, Cu, Pd, and Ni. The material that forms the coil conductor layers 15 is preferably Ag or Cu, more preferably Ag. Conductive materials may be used alone or in combination.

The thickness of the winding portions of the coil conductor layers 15 (i.e., the thickness of the portions other than the extended portions) may preferably be about 15 μm to about 70 μm, more preferably about 20 μm to about 60 μm, even more preferably about 25 μm to about 50 μm. As the thickness of the coil conductor layers becomes larger, the resistance of the multilayer coil component becomes lower. Here, the thickness refers to the thickness of the coil conductor layers in the stacking direction.

The extended portions of the coil conductor layers 15 include a region with a larger thickness (hereinafter referred to as "thicker portion") and a region with a smaller thickness (hereinafter referred to as "thinner portion"). The thicker region is located closer to the outer electrode to which the extended portion is connected. Specifically, the extended portion 18*a* of the coil conductor layer 15*a* includes a thicker portion 18*a*2 and a thinner portion 18*a*1. The thicker portion 18*a*2 is located closer to the outer electrode 4 than is the thinner portion 18*a*1. The extended portion 18*f* of the coil conductor layer 15*f* includes a thicker portion 18*f*2 and a thinner portion 18*f*1. The thicker portion 18*f*2 is located closer to the outer electrode 5 than is the thinner portion 18*f*1. This configuration improves the sealability at the connections between the outer electrodes and the extended portions.

The thickness of the thinner portion may preferably be about 15 μm to about 70 μm, more preferably about 20 μm to about 60 μm, even more preferably about 25 μm to about 50 μm. As the thickness of the thinner portion becomes larger, the resistance of the coil becomes lower.

The ratio of the thickness of the thicker portion to the thickness of the thinner portion (thickness of thicker portion/thickness of thinner portion) is preferably about 1.05 to about 2.00, more preferably about 1.10 to about 1.80, even more preferably about 1.20 to about 1.70. If the ratio of the thickness of the thicker portion to the thickness of the thinner portion falls within the above range, a gap is unlikely to form between the coil conductors of the extended portions and the insulator portion, and the adhesion between the coil conductors of the extended portions and the insulator portion is improved.

The thickness of the coil conductor layers can be measured as follows.

A chip is polished, with its LT surface facing polishing paper. Polishing is stopped at the central position along the width of the coil conductor layers. Thereafter, observation is performed under a microscope. The thickness at the central position along the length of the coil conductor layers is measured by a measuring function accompanying the microscope.

The connection conductors 16 are disposed so as to extend through the first insulator layers 11. The material that forms the connection conductors 16 may be any of the materials as mentioned for the coil conductor layers 15. The material that forms the connection conductors 16 may be the same as or different from the material that forms the coil conductor layers 15. In a preferred embodiment, the material that forms the connection conductors 16 is the same as the material that forms the coil conductor layers 15. In a preferred embodiment, the material that forms the connection conductors 16 is Ag.

The voids 21 function as so-called stress relaxation spaces.

In the present embodiment, as the multilayer coil component is viewed in plan view in the stacking direction, an end of the void at each extended portion facing the outer electrode to which the extended portion is connected is located closer to the outer electrode than is an end, facing the outer electrode, of the void at the coil conductor layer to which the extended portion is adjacent in the stacking direction. In other words, in a cross-section parallel to the stacking direction and perpendicular to the end surfaces on which the outer electrodes are disposed, an end of the void at each extended portion facing the outer electrode to which the extended portion is connected is located closer to the outer electrode than is an end, facing the outer electrode, of the void at the coil conductor layer to which the extended portion is adjacent in the stacking direction. In FIG. 3, the end of the void 21*a* at the extended portion 18*a* facing the outer electrode 4 is located closer to the outer electrode 4 than is the end, facing the outer electrode 4, of the void 21*b* at the coil conductor layer 15*b* to which the extended portion 18*a* is adjacent in the stacking direction. Similarly, the end of the void 21*f* at the extended portion 18*f* facing the outer electrode 5 is located closer to the outer electrode 5 than is the end, facing the outer electrode 5, of the void 21*e* at the coil conductor layer 15*e* to which the extended portion 18*f* is adjacent in the stacking direction. The above configuration can inhibit cracking due to a stress resulting from the shrinkage of thick extended portions.

The distance (t in FIG. 3) between the end of the void at each extended portion and the end of the void at the adjacent coil conductor layer is preferably about 50 μm to about 150 μm, more preferably about 60 μm to about 140 μm, even more preferably about 70 μm to about 130 μm. If the distance t is about 50 μm or more, cracking can be further inhibited. If the distance t is about 150 μm or less, the sealability at the connections between the outer electrodes and the extended portions is further improved.

The thickness of the voids 21 is preferably about 1 μm to about 30 μm, more preferably about 5 μm to about 15 μm. If the thickness of the voids 21 falls within the above range, the internal stress can be further relieved, and cracking can thus be further inhibited.

The thickness of the voids and the distance t can be measured as follows.

A chip is polished, with its LT surface facing polishing paper. Polishing is stopped at the central position along the width of the coil conductor layers. Thereafter, observation is performed under a microscope. The thickness of the voids at the central position along the length of the coil conductor layers is measured by a measuring function accompanying the microscope. The distance t is similarly measured.

In a preferred embodiment, as illustrated in FIGS. 2 and 3, as the multilayer coil component is viewed in plan view in the stacking direction, the voids at the coil conductor portions adjacent to the extended portions in the stacking direction are located inside the coil conductor layers. The voids 21 at the other positions have a larger width than the coil conductor layers 15 in a cross-section perpendicular to the winding direction of the coil. That is, the voids 21 are provided so as to extend beyond both edges of the coil conductor layers 15 in directions away from the coil conductor layers 15.

The outer electrodes 4 and 5 are disposed so as to cover both end surfaces of the body 2. The outer electrodes are formed of a conductive material, preferably one or more metal materials selected from Au, Ag, Pd, Ni, Sn, and Cu.

The outer electrodes may be composed of a single layer or a plurality of layers. In one embodiment, the outer electrodes may be composed of a plurality of layers, preferably two to four layers, for example, three layers.

In one embodiment, the outer electrodes may be composed of a plurality of layers including a layer containing Ag or Pd, a layer containing Ni, or a layer containing Sn. In a preferred embodiment, the outer electrodes are composed of a layer containing Ag or Pd, a layer containing Ni, and a layer containing Sn. Preferably, the outer electrodes are composed of, in sequence from the coil conductor layer side, a layer containing Ag or Pd, preferably Ag, a layer containing Ni, and a layer containing Sn. Preferably, the layer containing Ag or Pd is a layer formed by baking a Ag paste or a Pd paste, and the layer containing Ni and the layer containing Sn may be plating layers.

The multilayer coil component according to the present embodiment preferably has a length of about 0.4 mm to about 3.2 mm, a width of about 0.2 mm to about 2.5 mm, and a height of about 0.2 mm to about 2.0 mm, more preferably a length of about 0.6 mm to about 2.0 mm, a width of about 0.3 mm to about 1.3 mm, and a height of about 0.3 mm to about 1.0 mm.

A method for manufacturing the above multilayer coil component 1 according to the present embodiment will hereinafter be described. The embodiment described herein is an embodiment in which the insulator portion 6 is formed from a ferrite material.

(1) Preparation of Ferrite Paste

A ferrite material is first prepared. The ferrite material contains Fe, Zn, and Ni as the main constituents and further contains Cu as desired. Typically, the main constituents of the ferrite material are substantially composed of Fe, Zn, Ni, and Cu oxides (ideally, $Fe_2O_3$, ZnO, NiO, and CuO).

As the ferrite material, $Fe_2O_3$, ZnO, CuO, NiO, and optionally additive constituents are weighed so as to give a predetermined composition and are mixed and pulverized. The pulverized ferrite material is dried and calcined to obtain a calcined powder. Predetermined amounts of a solvent (e.g., a ketone-based solvent), a resin (e.g., polyvinyl acetal), and a plasticizer (e.g., an alkyd-based plasticizer) are added to the calcined powder, and they are mixed in a machine such as a planetary mixer and are further dispersed in a machine such as a three-roll mill. Thus, a ferrite paste can be prepared.

The Fe content of the ferrite material on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the ferrite material on a ZnO basis may preferably be about 5.0 mol % to about 35.0 mol %, more preferably about 10.0 mol % to about 30.0 mol % (based on the total amount of the main constituents; the same applies hereinafter).

The Cu content of the ferrite material on a CuO basis is preferably about 4.0 mol % to about 12.0 mol %, more preferably about 7.0 mol % to about 10.0 mol % (based on the total amount of the main constituents; the same applies hereinafter).

The Ni content of the ferrite material is not particularly limited and may be the balance excluding the other main constituents described above, namely, Fe, Zn, and Cu.

In one embodiment, the ferrite material contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the ferrite material may further contain additive constituents. Examples of additive constituents for the ferrite material include, but not limited to, Mn, Co, Sn, Bi, and Si. The Mn, Co, Sn, Bi, and Si contents (amounts added) on $Mn_3O_4$, $Co_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The ferrite material may further contain incidental impurities introduced during manufacture.

The Fe content (on an $Fe_2O_3$ basis), Mn content (on a $Mn_2O_3$ basis), Cu content (on a CuO basis), Zn content (on a ZnO basis), and Ni content (on a NiO basis) of the sintered ferrite may be assumed to be substantially equal to the Fe content (on an $Fe_2O_3$ basis), Mn content (on a $Mn_2O_3$ basis), Cu content (on a CuO basis), Zn content (on a ZnO basis), and Ni content (on a NiO basis) of the ferrite material before firing.

(2) Preparation of Conductive Paste for Coil Conductors

A conductive material is first prepared. The conductive material may be, for example, Au, Ag, Cu, Pd, or Ni, preferably Ag or Cu, more preferably Ag. A predetermined amount of a powder of the conductive material is weighed and mixed with predetermined amounts of a solvent (e.g., eugenol), a resin (e.g., ethylcellulose), and a dispersant in a machine such as a planetary mixer and is then dispersed in a machine such as a three-roll mill. Thus, a conductive paste for coil conductors can be prepared.

(3) Preparation of Resin Paste

A resin paste for formation of voids in the multilayer coil component 1 is prepared. The resin paste can be prepared by adding a resin (e.g., an acrylic resin) that disappears during firing to a solvent (e.g., isophorone).

(4) Fabrication of Multilayer Coil Component (4-1) Fabrication of Body

Figures 5A, 5B, 5C, 5D, 5E, 5F, 5G, 5H, 5I, 5J, 5K, 5L, 5M, 5N, 5O, 5P, 5Q:
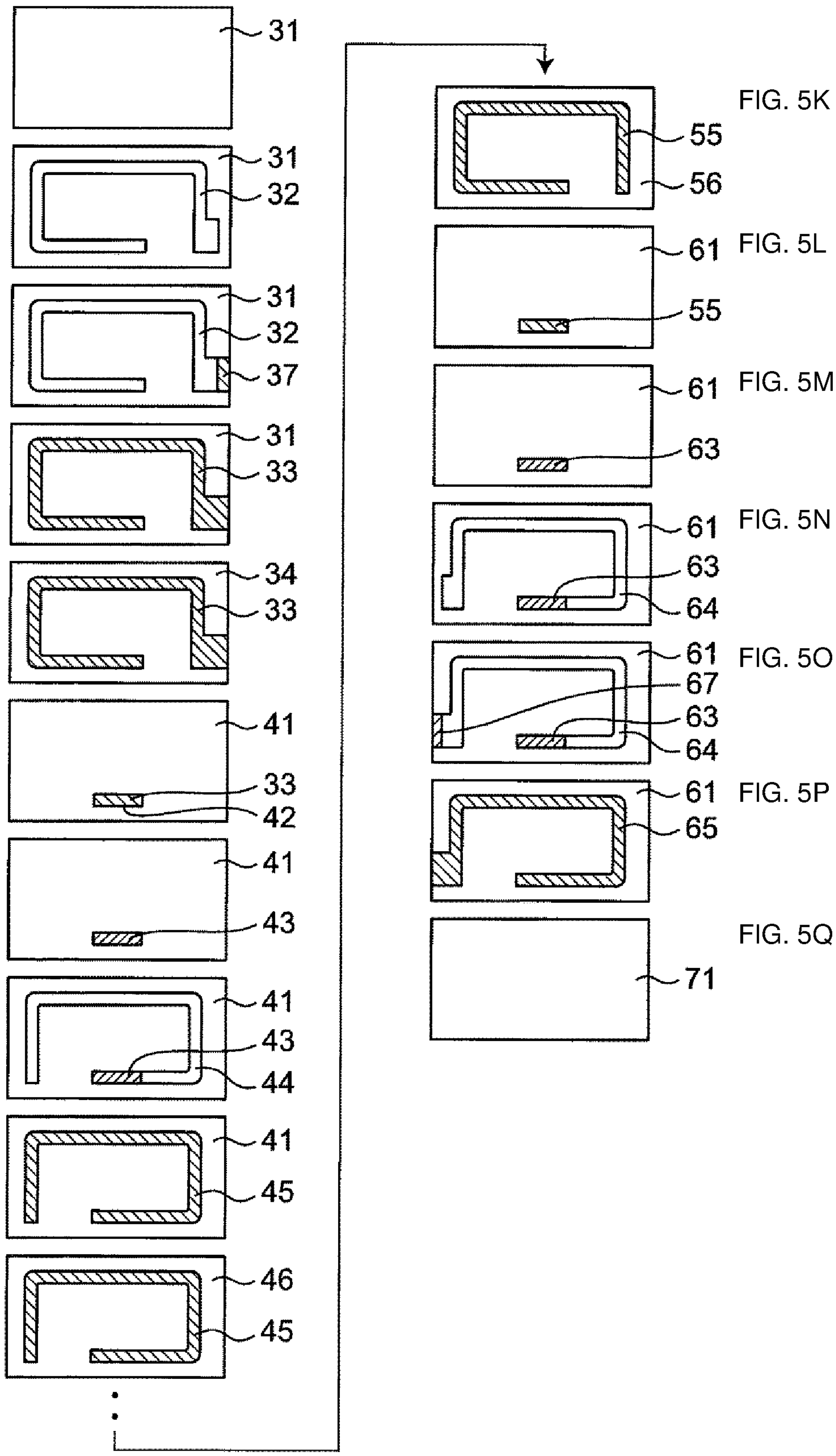
FIGS. 5A to 5Q illustrate a method for manufacturing the multilayer coil component 1 illustrated in FIG. 1.

A thermal release sheet and a polyethylene terephthalate (PET) film are first stacked on a metal plate (not illustrated). The ferrite paste is applied by printing a predetermined number of times to form a first ferrite paste layer 31 that forms an outer layer (FIG. 5A). This layer corresponds to the first insulator layers 11.

The resin paste is then applied by printing to the area where the void 21*a* is to be formed to form a resin paste layer 32 (FIG. 5B).

The conductive paste is then applied by printing to the area where the extended portion 18 is to be formed between the resin paste layer 32 and the end surface to form an extended conductor additional layer 37 (FIG. 5C). The extended portion 18 is thicker in the area where the extended conductor additional layer 37 is formed.

The conductive paste is then applied by printing to the area where the coil conductor layer 15*a* is to be formed to form a conductive paste layer 33 (FIG. 5D).

Figure 6:
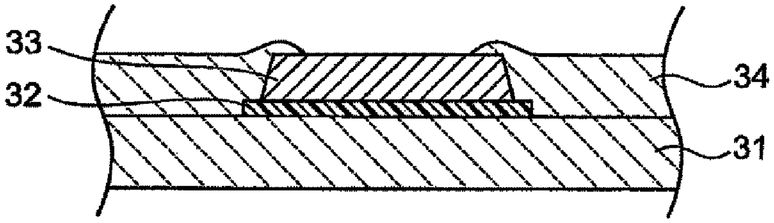
FIG. 6 is an enlarged view of a cross-section of a coil conductor portion in FIG. 5E.

The ferrite paste is then applied by printing to the region where the conductive paste layer 33 is not formed to form a second ferrite paste layer 34 (FIG. 5E). The second ferrite paste layer 34 is preferably provided so as to cover the outer edge portions of the conductive paste layer 33 (FIG. 6). This layer corresponds to the second insulator layers 12.

The ferrite paste is then applied by printing to the region other than the area where a connection conductor for connecting coil conductor layers adjacent to each other in the stacking direction is to be formed to form a first ferrite paste layer 41 (FIG. 5F). This layer corresponds to the first insulator layers 11. A hole 42 is formed in the area where the connection conductor is to be formed.

The conductive paste is then applied by printing to the hole 42 to form a connection conductor paste layer 43 (FIG. 5G).

Steps similar to those in FIGS. 5B to 5G are then repeated as appropriate to form the individual layers illustrated in FIGS. 2 and 3 (e.g., FIGS. 5H to 5P). Finally, the ferrite paste is applied by printing a predetermined number of times to form a first ferrite paste layer 71 that forms an outer layer (FIG. 5Q). This layer corresponds to the first insulator layers 11.

The layers are then bonded together on the metal plate by pressure, followed by cooling and removal of the metal plate and then the PET film to obtain an element assembly (unfired multilayer block)). This unfired multilayer block is cut into individual bodies with a tool such as a dicer.

The resulting unfired bodies are subjected to barrel finishing to round the corners of the bodies. Barrel finishing may be performed either on the unfired multilayer bodies or on fired multilayer bodies. Barrel finishing may be performed either by a dry process or by a wet process. Barrel finishing may be performed by polishing the elements either with each other or with media.

After barrel finishing, the unfired bodies are fired at a temperature of, for example, about 910° C. to about 935° C. to obtain bodies 2 for multilayer coil components 1. After firing, the resin paste layers disappear, thus forming the voids 21.

(4-2) Formation of Outer Electrodes

A Ag paste containing Ag and glass for formation of outer electrodes is then applied to the end surfaces of the bodies 2 and is baked to form underlying electrodes. A Ni coating and a Sn coating are then formed in sequence over the underlying electrodes by electrolytic plating to form outer electrodes. Thus, multilayer coil components 1 as illustrated in FIG. 1 are obtained.

Although one embodiment of the present disclosure has been described above, various modifications can be made to the present embodiment.

For example, in the above embodiment, elements may be obtained by preparing ferrite sheets corresponding to the individual insulating layers, forming coil patterns on the sheets by printing, and bonding the sheets together by pressure.

The multilayer coil components manufactured by the above method according to the present embodiment have a low coil conductor resistance and a reduced susceptibility to cracking.

EXAMPLES

Examples

Preparation of Ferrite Paste

Powders of $Fe_2O_3$, ZnO, CuO, and NiO were weighed such that the amounts thereof were 49.0 mol %, 25.0 mol %, 8.0 mol %, and the balance, respectively, based on the total amount of the powders. These powders were mixed and pulverized, were dried, and were calcined at 700° C. to obtain a calcined powder. Predetermined amounts of a ketone-based solvent, polyvinyl acetal, and an alkyd-based plasticizer were added to the calcined powder, and they were mixed in a planetary mixer and were further dispersed in a three-roll mill. Thus, a ferrite paste was prepared.

Preparation of Conductive Paste for Coil Conductors

A predetermined amount of silver powder was prepared as a conductive material. The silver powder was mixed with eugenol, ethylcellulose, and a dispersant in a planetary mixer and was then dispersed in a three-roll mill. Thus, a conductive paste for coil conductors was prepared.

Preparation of Resin Paste

A resin paste was prepared by mixing isophorone with an acrylic resin.

Fabrication of Multilayer Coil Component

Unfired multilayer blocks were fabricated by the procedure illustrated in FIGS. 5A to 5Q using the ferrite paste, the conductive paste, and the resin paste. The conductive paste layers had a thickness of 70 μm. In addition, voids were formed such that the distance t illustrated in FIG. 3 was −50 μm, 0 μm, 50 μm, 100 μm, or 150 μm. The minus sign means that the voids overlapped as viewed in plan view in the stacking direction, and −50 μm and 0 μm correspond to comparative examples.

The multilayer blocks were then cut into individual elements with a dicer or the like. The resulting elements were subjected to barrel finishing to round the corners of the elements. After barrel finishing, the elements were fired at a temperature of 920° C. to obtain bodies.

A Ag paste containing Ag and glass for formation of outer electrodes was then applied to the end surfaces of the bodies and was baked to form underlying electrodes. A Ni coating and a Sn coating were then formed in sequence over the underlying electrodes by electrolytic plating to form outer electrodes. Thus, multilayer coil components were obtained.

The multilayer coil components obtained as described above each had a length (L) of 1.6 mm, a width (W) of 0.8 mm, and a height (T) of 0.8 mm Evaluation For each type of multilayer coil component obtained as described above, 30 multilayer coil components were evaluated for the presence or absence of cracks. The number of multilayer coil components with cracks is listed in Table 1 below.

TABLE 1

| Distance t (μm) | Number of multilayer coil components with cracks |
|---|---|
| −50 | 25/30 |
| 0 | 20/30 |

TABLE 1-continued

| Distance t (μm) | Number of multilayer coil components with cracks |
|---|---|
| 50 | 0/30 |
| 100 | 0/30 |
| 150 | 0/30 |

The results demonstrated that the multilayer coil components with distances t of more than 0 were not cracked after firing.

Multilayer coil components according to embodiments of the present disclosure can be used in a wide variety of applications including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an insulator portion;

a coil embedded in the insulator portion and including a plurality of coil conductor layers electrically connected together such that a void exists at a boundary between one main surface of the coil conductor layer and the insulator portion; and an outer electrode disposed on a surface of the insulator portion and electrically connected to the coil, wherein at least one of the coil conductor layers includes an extended portion and a winding portion, and is connected to the outer electrode via the extended portion, and when the multilayer coil component is viewed in plan view in a stacking direction, an end, at the outer electrode side, of a void at the extended portion which is connected to the outer electrode is located closer to the outer electrode than an end, at the outer electrode side, of the void at the coil conductor layer which is adjacent to the extended portion in the stacking direction, and the void at the extended portion extends beyond the extended portion in a direction away from the outer electrode to an end which overlaps the void at the coil conductor layer.

2. The multilayer coil component according to claim 1, wherein a distance between the end of the void at the extended portion and the end of the void at the coil conductor layer which is adjacent to the extended portion in the stacking direction is 50 μm to 150 μm.

3. The multilayer coil component according to claim 2, wherein the winding portion of the coil conductor layer has a thickness of 25 μm to 50 μm.

4. The multilayer coil component according to claim 3, wherein the extended portion includes a thicker portion and a thinner portion, the thicker portion being located closer to the outer electrode to which the extended portion is connected.

5. The multilayer coil component according to claim 4, wherein a ratio of a thickness of the thicker portion to a thickness of the thinner portion is 1.05 to 2.00.

6. The multilayer coil component according to claim 5, wherein the thinner portion has a thickness of 15 μm to 45 μm.

7. The multilayer coil component according to claim 4, wherein the thinner portion has a thickness of 15 μm to 45 μm.

8. The multilayer coil component according to claim 2, wherein the extended portion includes a thicker portion and a thinner portion, the thicker portion being located closer to the outer electrode to which the extended portion is connected.

9. The multilayer coil component according to claim 8, wherein a ratio of a thickness of the thicker portion to a thickness of the thinner portion is 1.05 to 2.00.

10. The multilayer coil component according to claim 9, wherein the thinner portion has a thickness of 15 μm to 45 μm.

11. The multilayer coil component according to claim 8, wherein the thinner portion has a thickness of 15 μm to 45 μm.

12. The multilayer coil component according to claim 1, wherein the winding portion of the coil conductor layer has a thickness of 25 μm to 50 μm.

13. The multilayer coil component according to claim 12, wherein the extended portion includes a thicker portion and a thinner portion, the thicker portion being located closer to the outer electrode to which the extended portion is connected.

14. The multilayer coil component according to claim 13, wherein a ratio of a thickness of the thicker portion to a thickness of the thinner portion is 1.05 to 2.00.

15. The multilayer coil component according to claim 14, wherein the thinner portion has a thickness of 15 μm to 45 μm.

16. The multilayer coil component according to claim 13, wherein the thinner portion has a thickness of 15 μm to 45 μm.

17. The multilayer coil component according to claim 1, wherein the extended portion includes a thicker portion and a thinner portion, the thicker portion being located closer to the outer electrode to which the extended portion is connected.

18. The multilayer coil component according to claim 17, wherein a ratio of a thickness of the thicker portion to a thickness of the thinner portion is 1.05 to 2.00.

19. The multilayer coil component according to claim 17, wherein the thinner portion has a thickness of 15 μm to 45 μm.

20. A multilayer coil component comprising:

an insulator portion;

a coil embedded in the insulator portion and including a plurality of coil conductor layers electrically connected together such that a void exists at a boundary between one main surface of the coil conductor layer and the insulator portion; and an outer electrode disposed on a surface of the insulator portion and electrically connected to the coil, wherein at least one of the coil conductor layers includes an extended portion and a winding portion, and is connected to the outer electrode via the extended portion, when the multilayer coil component is viewed in plan view in a stacking direction, an end, at the outer electrode side, of a void at the extended portion which is connected to the outer electrode is located closer to the outer electrode than an end, at the outer electrode side, of the void at the coil conductor layer which is adjacent to the extended portion in the stacking direction, and a distance between the end of the void at the extended portion and the end of the void at the coil conductor layer which is adjacent to the extended portion in the stacking direction is 50 μm to 150 μm.

* * * * *